(12) United States Patent
Vallius

(10) Patent No.: US 9,946,072 B2
(45) Date of Patent: Apr. 17, 2018

(54) DIFFRACTIVE OPTICAL ELEMENT WITH UNCOUPLED GRATING STRUCTURES

(71) Applicant: Microsoft Technology Licensing, LLC, Redmond, WA (US)

(72) Inventor: Tuomas Vallius, Espoo (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 66 days.

(21) Appl. No.: 14/926,643

(22) Filed: Oct. 29, 2015

(65) Prior Publication Data

US 2017/0123208 A1 May 4, 2017

(51) Int. Cl.
*G06F 3/14* (2006.01)
*G02B 27/01* (2006.01)
(Continued)

(52) U.S. Cl.
CPC ....... *G02B 27/0172* (2013.01); *G02B 5/1842* (2013.01); *G02B 6/005* (2013.01);
(Continued)

(58) Field of Classification Search
CPC .... G02B 2027/0118; G02B 2027/0123; G02B 27/0081; G02B 27/0172; G02B 27/4205;
(Continued)

(56) References Cited

U.S. PATENT DOCUMENTS

| 3,980,883 A | 9/1976 | Franks |
| 5,224,198 A | 6/1993 | Jachimowicz |

(Continued)

FOREIGN PATENT DOCUMENTS

| EP | 2163924 A1 | 3/2010 |
| EP | 2752691 A1 | 7/2014 |

(Continued)

OTHER PUBLICATIONS

"International Search Report & Written Opinion Issued in PCT Application No. PCT/US2016/039705", dated Sep. 15, 2016, (13 Pages total).

(Continued)

*Primary Examiner* — Tony Davis
(74) *Attorney, Agent, or Firm* — Mark K. Young; Mayer & Williams PC

(57) ABSTRACT

In an optical display system having a waveguide and multiple diffractive optical elements (DOEs), an in-coupling DOE couples light into the waveguide, an intermediate DOE provides exit pupil expansion in a first direction, and an out-coupling DOE provides exit pupil expansion in a second direction and couples light out of the waveguide. The intermediate DOE includes grating features that are configured to rotate a state of polarization of light perturbations in the intermediate DOE that would otherwise generate optical interference through a closed-loop coupling phenomenon. The polarization state of a perturbed beam is rotated in the intermediate DOE to be orthogonal relative to the polarization state of the main beam used for image display to thereby uncouple the closed loops and make the perturbed beam non-interfering with the imaging beam.

20 Claims, 19 Drawing Sheets

(51) Int. Cl.
*G02B 27/42* (2006.01)
*F21V 8/00* (2006.01)
*G02B 27/00* (2006.01)
*G02B 5/18* (2006.01)

(52) U.S. Cl.
CPC ....... *G02B 6/0026* (2013.01); *G02B 27/0081* (2013.01); *G02B 27/4205* (2013.01); *G02B 27/4261* (2013.01); *G02B 27/4272* (2013.01); *G06F 3/14* (2013.01); *G02B 2027/0118* (2013.01); *G02B 2027/0123* (2013.01)

(58) Field of Classification Search
CPC ............ G02B 27/4261; G02B 27/4272; G02B 5/1842; G02B 6/0026; G02B 6/005; G06F 3/14
USPC ............................................................ 345/8
See application file for complete search history.

(56) References Cited

U.S. PATENT DOCUMENTS

| | | | | |
|---|---|---|---|---|
| 6,046,541 | A * | 4/2000 | Valliath | H01J 29/864 313/258 |
| 6,147,725 | A | 11/2000 | Yuuki | |
| 6,410,213 | B1 * | 6/2002 | Raguin | G03F 7/001 430/321 |
| 6,909,546 | B2 * | 6/2005 | Hirai | G02B 27/09 359/565 |
| 7,339,738 | B1 * | 3/2008 | Carr | G02B 26/0808 359/291 |
| 7,627,018 | B1 | 12/2009 | Guilfoyle | |
| 8,233,204 | B1 | 7/2012 | Robbins | |
| 8,548,290 | B2 | 10/2013 | Travers | |
| 8,593,734 | B2 | 11/2013 | Laakkonen | |
| 8,681,184 | B2 | 3/2014 | Seesselberg | |
| 9,671,615 | B1 | 6/2017 | Vallius | |
| 2001/0015851 | A1 * | 8/2001 | Danziger | G02B 5/1876 359/575 |
| 2001/0036012 | A1 * | 11/2001 | Nakai | G02B 5/1823 359/569 |
| 2004/0170356 | A1 * | 9/2004 | Iazikov | G02B 5/203 385/37 |
| 2004/0184147 | A1 | 9/2004 | Parikka | |
| 2004/0233534 | A1 | 11/2004 | Nakanishi | |
| 2005/0002611 | A1 | 1/2005 | Levola | |
| 2007/0188837 | A1 | 8/2007 | Shimizu et al. | |
| 2007/0291362 | A1 * | 12/2007 | Hill | G02B 5/1842 359/567 |
| 2008/0043334 | A1 | 2/2008 | Itzkovitch | |
| 2008/0138013 | A1 * | 6/2008 | Parriaux | G02B 5/1814 385/37 |
| 2008/0212921 | A1 * | 9/2008 | Gaylord | B82Y 20/00 385/14 |
| 2009/0009486 | A1 * | 1/2009 | Sato | G02F 1/13338 345/174 |
| 2009/0040607 | A1 * | 2/2009 | Amako | G02B 5/1809 359/485.01 |
| 2009/0245730 | A1 | 10/2009 | Kleemann | |
| 2009/0257106 | A1 * | 10/2009 | Tan | G02B 27/48 359/279 |
| 2009/0303599 | A1 * | 12/2009 | Levola | G02B 27/0081 359/567 |
| 2010/0079865 | A1 * | 4/2010 | Saarikko | G02B 6/0016 359/566 |
| 2010/0134534 | A1 | 6/2010 | Seesselberg | |
| 2010/0231693 | A1 * | 9/2010 | Levola | G02B 27/0081 348/51 |
| 2010/0232016 | A1 | 9/2010 | Landa | |
| 2010/0277803 | A1 | 11/2010 | Pockett | |
| 2010/0284085 | A1 | 11/2010 | Laakkonen | |
| 2010/0296163 | A1 * | 11/2010 | Saarikko | G02B 5/1814 359/567 |
| 2010/0315719 | A1 * | 12/2010 | Saarikko | G02B 27/0081 359/630 |
| 2010/0321781 | A1 | 12/2010 | Levola | |
| 2011/0019874 | A1 | 1/2011 | Jarvenpaa et al. | |
| 2011/0038049 | A1 | 2/2011 | Vallius | |
| 2011/0096401 | A1 | 4/2011 | Levola | |
| 2011/0115733 | A1 * | 5/2011 | Shih | G06F 3/0412 345/173 |
| 2011/0261366 | A1 * | 10/2011 | Tearney | A61B 5/0066 356/479 |
| 2012/0120365 | A1 * | 5/2012 | Legerton | G02B 27/0172 351/159.02 |
| 2012/0224062 | A1 * | 9/2012 | Lacoste | G01C 21/365 348/148 |
| 2013/0051730 | A1 | 2/2013 | Travers | |
| 2013/0077049 | A1 | 3/2013 | Bohn | |
| 2013/0135193 | A1 * | 5/2013 | Fike, III | G02B 26/00 345/156 |
| 2013/0261782 | A1 * | 10/2013 | Becken | G02C 7/02 700/95 |
| 2013/0314793 | A1 | 11/2013 | Robbins | |
| 2013/0322810 | A1 | 12/2013 | Robbins | |
| 2014/0002608 | A1 * | 1/2014 | Atwell | G01B 5/008 348/46 |
| 2014/0185142 | A1 | 7/2014 | Gupta et al. | |
| 2014/0240834 | A1 | 8/2014 | Mason | |
| 2014/0240843 | A1 * | 8/2014 | Kollin | G02B 27/0172 359/633 |
| 2014/0293434 | A1 | 10/2014 | Cheng | |
| 2015/0034591 | A1 | 2/2015 | Vink | |
| 2015/0083917 | A1 * | 3/2015 | Wyrwas | G01J 1/42 250/341.1 |
| 2015/0092042 | A1 | 4/2015 | Fursich | |
| 2015/0108479 | A1 * | 4/2015 | Brinkley | H01L 27/1218 257/59 |
| 2015/0185475 | A1 | 7/2015 | Saarikko | |
| 2015/0234477 | A1 | 8/2015 | Abovitz | |
| 2015/0234491 | A1 * | 8/2015 | Liu | G06F 1/1626 345/174 |
| 2015/0277116 | A1 * | 10/2015 | Richards | G02B 27/0103 359/13 |
| 2015/0331544 | A1 * | 11/2015 | Bergstrom | G06F 3/0428 345/175 |
| 2015/0355394 | A1 | 12/2015 | Valera | |
| 2015/0382465 | A1 * | 12/2015 | Steyn | H05K 1/0274 361/783 |
| 2016/0018637 | A1 * | 1/2016 | Sparks | G02B 26/04 345/690 |
| 2016/0026253 | A1 * | 1/2016 | Bradski | G02B 27/225 345/8 |
| 2016/0116739 | A1 * | 4/2016 | TeKolste | G02B 27/0172 385/36 |
| 2016/0231570 | A1 | 8/2016 | Levola | G02B 27/0172 |
| 2016/0234485 | A1 * | 8/2016 | Robbins | H04N 13/0429 |
| 2016/0291405 | A1 * | 10/2016 | Frisken | G02F 1/133504 |
| 2016/0327789 | A1 * | 11/2016 | Klug | G02B 27/0101 |
| 2016/0334635 | A1 * | 11/2016 | Ushigome | G02B 27/4272 |
| 2017/0003504 | A1 * | 1/2017 | Vallius | G02B 27/0101 |
| 2017/0003505 | A1 * | 1/2017 | Vallius | G02B 5/1819 |
| 2017/0031171 | A1 * | 2/2017 | Vallius | G02B 5/1819 |
| 2017/0034435 | A1 * | 2/2017 | Vallius | H04N 5/23229 |
| 2017/0059879 | A1 * | 3/2017 | Vallius | G02B 27/4205 |
| 2017/0102543 | A1 * | 4/2017 | Vallius | G02B 27/0172 |
| 2017/0102544 | A1 * | 4/2017 | Vallius | G02B 27/0172 |
| 2017/0122725 | A1 * | 5/2017 | Yeoh | G01B 11/14 |
| 2017/0123208 | A1 * | 5/2017 | Vallius | G02B 27/0172 |
| 2017/0124928 | A1 * | 5/2017 | Edwin | G09G 3/003 |
| 2017/0131460 | A1 * | 5/2017 | Lin | G02B 6/0026 |
| 2017/0131545 | A1 * | 5/2017 | Wall | G02B 27/0101 |
| 2017/0131546 | A1 * | 5/2017 | Woltman | G02B 5/1866 |
| 2017/0131551 | A1 * | 5/2017 | Robbins | G02B 5/1828 |
| 2017/0139210 | A1 * | 5/2017 | Vallius | G02B 27/0172 |

FOREIGN PATENT DOCUMENTS

| | | | |
|---|---|---|---|
| EP | 2887119 | A1 | 6/2015 |
| GB | 2495398 | A | 4/2013 |

(56) References Cited

FOREIGN PATENT DOCUMENTS

| WO | 2004055556 A1 | 7/2004 |
|---|---|---|
| WO | 2004109349 A2 | 12/2004 |
| WO | 2006132614 A1 | 12/2006 |
| WO | 2007141589 A1 | 12/2007 |
| WO | 2008038058 A1 | 4/2008 |
| WO | 2008081070 A1 | 7/2008 |
| WO | 2008148927 A1 | 12/2008 |
| WO | 2009077803 A1 | 6/2009 |
| WO | 2009101236 A1 | 8/2009 |
| WO | 2009101238 A1 | 8/2009 |
| WO | 2013144565 A1 | 10/2013 |
| WO | 2015063808 A1 | 5/2015 |
| WO | 2016130358 A1 | 8/2016 |

OTHER PUBLICATIONS

"International Search Report and Written Opinion Issued in PCT Application No. PCT/US2016/038857", dated Sep. 28, 2016, (16 Pages total).

"International Search Report and Written Opinion Issued in PCT Application No. PCT/US2016/039706", dated Oct. 6, 2016, (13 Pages total).

"International Search Report and Written Opinion Issued in PCT Application No. PCT/US2016/044947", dated Oct. 11, 2016, (14 Pages total).

"International Search Report and Written Opinion Issued in PCT Application No. PCT/US2016/037460", dated Oct. 24, 2016, (12 Pages total).

"International Search Report and Written Opinion Issued in PCT Application No. PCT/US2016/058332", dated Feb. 21, 2017, 14 Pages.

Saarikko, et al., "Diffractive Exit-pupil Expander for Spherical Light Guide Virtual Displays Designed for Near-Distance Viewing", In the Journal of Optics A: Pure and Applied Optics, vol. 11, Issue 6, Mar. 31, 2009, 10 Pages.

"International Search Report and Written Opinion Issued in PCT Application No. PCT/US2016/052405", dated Dec. 21, 2016, (10 Pages total).

"International Search Report and Written Opinion Issued in PCT Application No. PCT/US2016/051563", dated Nov. 18, 2016, 10 Pages.

"Second Written Opinion Issued in PCT Application No. PCT/US2016/039706", dated Jun. 27, 2017, (5 Pages total).

"Second Written Opinion Issued in PCT Application No. PCT/US2016/039705", dated Jul. 10, 2017, (7 Pages total).

"Second Written Opinion Issued in PCT Application No. PCT/US2016/044947", dated Jul. 13, 2017, (8 Pages total).

"Second Written Opinion Issued in PCT Application No. PCT/US2016/058332", Dated Dec. 14, 2017, 10 Pages.

"International Preliminary Report on Patentability Issued in PCT Application No. PCT/US2016/058332", Dated Feb. 13, 2018, 11 Pages.

* cited by examiner

DIFFRACTIVE OPTICAL ELEMENT WITH UNCOUPLED GRATING STRUCTURES

BACKGROUND

Diffractive optical elements (DOEs) are optical elements with a periodic structure that are commonly utilized in applications ranging from bio-technology, material processing, sensing, and testing to technical optics and optical metrology. By incorporating DOEs in an optical field of a laser or emissive display, for example, the light's "shape" can be controlled and changed flexibly according to application needs.

SUMMARY

In an optical display system having a waveguide and multiple diffractive optical elements (DOEs), an in-coupling DOE couples light into the waveguide, an intermediate DOE provides exit pupil expansion in a first direction, and an out-coupling DOE provides exit pupil expansion in a second direction and couples light out of the waveguide. The intermediate DOE includes grating features that are configured to rotate a state of polarization of light perturbations in the intermediate DOE that would otherwise generate optical interference through a closed-loop coupling phenomenon. The polarization state of a perturbed beam is rotated in the intermediate DOE to be orthogonal relative to the polarization state of the main beam used for imaging to thereby uncouple the closed loops and make the perturbed beam non-interfering with the main imaging beam. The direction of the depth modulation (i.e., the direction of steepest change in grating depth) in the intermediate DOE may be varied to keep the interference of the closed loops either constructive or destructive. Closed-loop coupling is a root cause of optical interference and results from light having multiple different paths to a given location in the intermediate DOE in which the path length differences are smaller than the coherence length of the light.

Optical interference is typically manifested as dark stripes in the display system which is referred to as "banding." Banding may be more pronounced when polymeric materials are used in volume production of the DOE to minimize system weight as polymeric materials may have less optimal optical properties compared with other materials such as glass. In addition, even small nanometer-scale variations in fabricated DOEs can exacerbate the interference. By removing the closed-loop coupling, the various manufacturing defects and variations in surface characteristics (e.g., roughness), grating line width and depth, thickness, etc. only impact the orthogonally polarized perturbed beam which is non-interfering with the imaging beam. The intermediate DOE when configured with uncoupled grating structures enables an image in the out-coupling DOE to have increased optical resolution, uniformity, and color fidelity and the overall optical display system gains increased tolerance to manufacturing errors.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
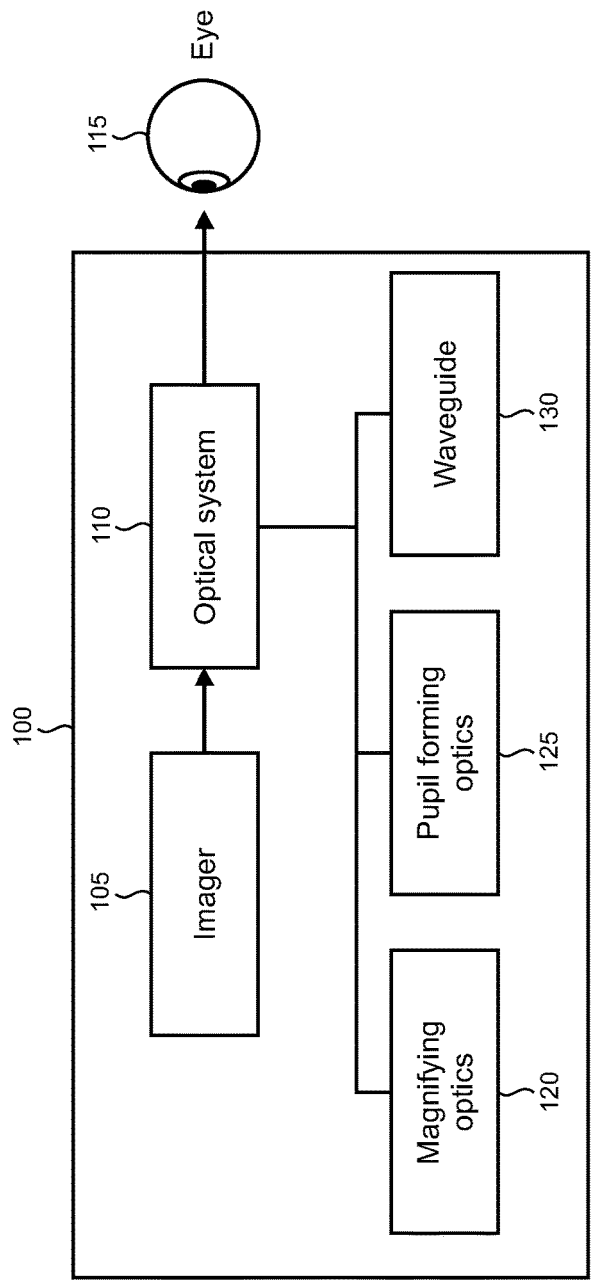
FIG. 1 shows a block diagram of an illustrative near-eye display system which may incorporate a diffractive optical element (DOE) with uncoupled grating structures.

FIG. 1 shows a block diagram of an illustrative optical near-eye display system 100 which may incorporate one or more diffractive optical elements (DOEs) with uncoupled grating structures. Near-eye display systems are frequently used, for example, in head mounted display (HMD) devices in industrial, commercial, and consumer applications. Other devices and systems may also use DOEs with uncoupled grating structures, as described below. The near-eye display system 100 is intended to be an example that is used to illustrate various features and aspects, and the present DOEs are not necessarily limited to near-eye display systems.

System 100 may include an imager 105 that works with an optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 105 may also include mirrors and other components that enable a virtual display to be composed and provide one or more input optical beams to the optical system. The optical system 110 can typically include magnifying optics 120, pupil forming optics 125, and one or more waveguides 130.

In a near-eye display system the imager does not actually shine the images on a surface such as a glass lens to create the visual display for the user. This is not feasible because the human eye cannot focus on something that is that close. Indeed, rather than create a visible image on a surface, the near-eye optical system 100 uses the pupil forming optics 125 to form a pupil and the eye 115 acts as the last element in the optical chain and converts the light from the pupil into an image on the eye's retina as a virtual display.

Figure 2:
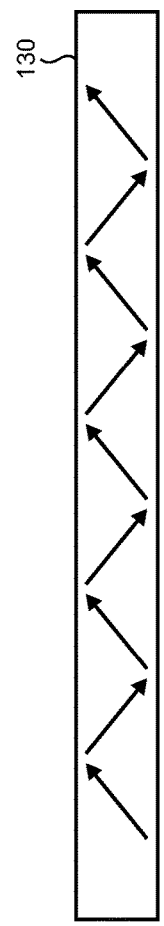
FIG. 2 shows propagation of light in a waveguide by total internal reflection.

The waveguide 130 facilitates light transmission between the imager and the eye. One or more waveguides can be utilized in the near-eye display system because they are transparent and because they are generally small and lightweight (which is desirable in applications such as HMD devices where size and weight are generally sought to be minimized for reasons of performance and user comfort). For example, the waveguide 130 can enable the imager 105 to be located out of the way, for example, on the side of the head, leaving only a relatively small, light, and transparent waveguide optical element in front of the eyes. In one implementation, the waveguide 130 operates using a principle of total internal reflection, as shown in FIG. 2, so that light can be coupled among the various optical elements in the system 100.

Figure 3:
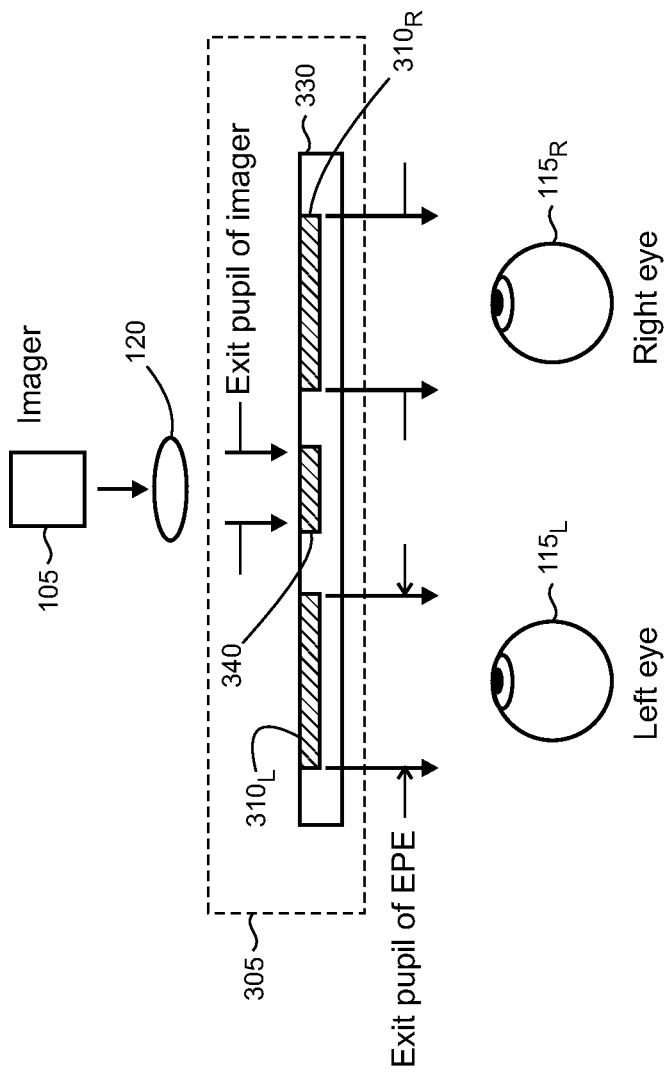
FIG. 3 shows a view of an illustrative exit pupil expander.

FIG. 3 shows a view of an illustrative exit pupil expander (EPE) 305. EPE 305 receives an input optical beam from the imager 105 through magnifying optics 120 to produce one or more output optical beams with expanded exit pupil in one or two directions relative to the exit pupil of the imager (in general, the input may include more than one optical beam which may be produced by separate sources). The expanded exit pupil typically facilitates a virtual display to be sufficiently sized to meet the various design requirements of a given optical system, such as image resolution, field of view, and the like, while enabling the imager and associated components to be relatively light and compact.

The EPE 305 is configured, in this illustrative example, to support binocular operation for both the left and right eyes. Components that may be utilized for stereoscopic operation such as scanning mirrors, lenses, filters, beam splitters, MEMS devices, or the like are not shown in FIG. 3 for sake of clarity in exposition. The EPE 305 utilizes two out-coupling gratings, $310_L$ and $310_R$ that are supported on a waveguide 330 and a central in-coupling grating 340. The in-coupling and out-coupling gratings may be configured using multiple DOEs, as described in the illustrative example below. While the EPE 305 is depicted as having a planar configuration, other shapes may also be utilized including, for example, curved or partially spherical shapes, in which case the gratings disposed thereon are non-coplanar.

Figure 4:
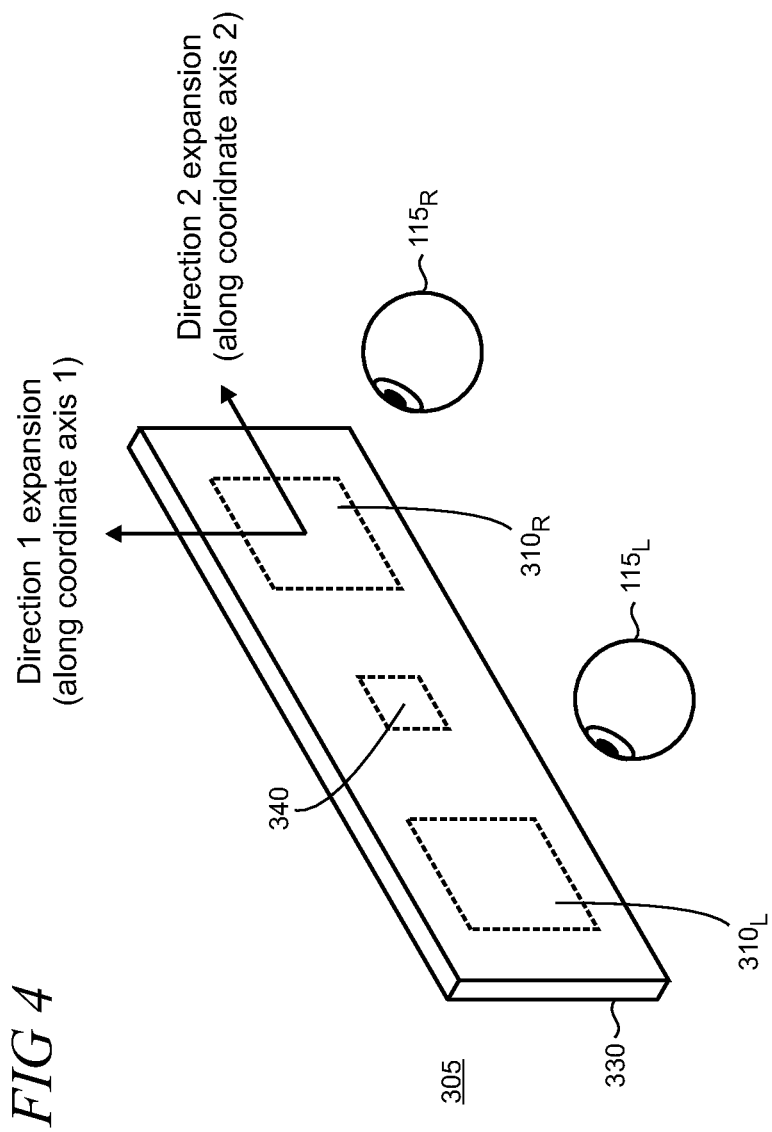
FIG. 4 shows a view of the illustrative exit pupil expander in which the exit pupil is expanded along two directions.

As shown in FIG. 4, the EPE 305 may be configured to provide an expanded exit pupil in two directions (i.e., along each of a first and second coordinate axis). As shown, the exit pupil is expanded in both the vertical and horizontal directions. It may be understood that the terms "direction," "horizontal," and "vertical" are used primarily to establish relative orientations in the illustrative examples shown and described herein for ease of description. These terms may be intuitive for a usage scenario in which the user of the near-eye display device is upright and forward facing, but less intuitive for other usage scenarios. The listed terms are not to be construed to limit the scope of the configurations (and usage scenarios therein) of DOEs with uncoupled grating structures.

Figure 5:
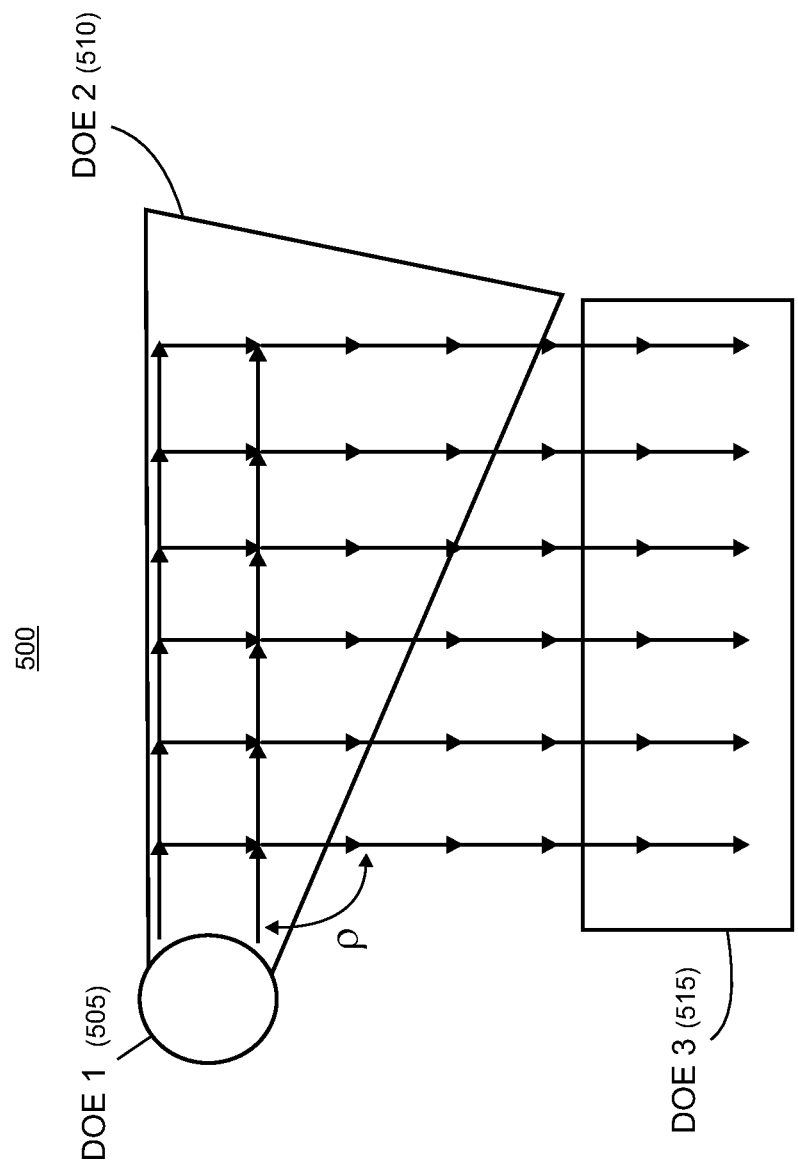
FIG. 5 shows an illustrative arrangement of three discrete DOEs.

FIG. 5 shows an illustrative arrangement 500 of three discrete DOEs that may be used as part of a waveguide to provide in-coupling and expansion of the exit pupil in two directions. In this illustrative example, each DOE is an optical element comprising a periodic structure that can modulate various properties of light in a one-dimensional (1D) periodic pattern such as the direction of optical axis, optical path length, and the like. The first DOE, DOE 1 (indicated by reference numeral 505), is configured to couple the beam from the imager into the waveguide. The second DOE, DOE 2 (510), expands the exit pupil in a first direction along a first coordinate axis, and the third DOE, DOE 3 (515), expands the exit pupil in a second direction along a second coordinate axis and couples light out of the waveguide. The angle p is a rotation angle between the periodic lines of DOE 2 and DOE 3 as shown. DOE 1 thus functions as an in-coupling grating and DOE 3 functions as an out-coupling grating while expanding the pupil in one direction. DOE 2 may be viewed as an intermediate grating that functions to couple light between the in-coupling and out-coupling gratings while performing exit pupil expansion in the other direction. Using such intermediate grating may eliminate a need for conventional functionalities for exit pupil expansion in an EPE such as collimating lenses.

Some near-eye display system applications, such as those using HMD devices for example, can benefit from minimization of weight and bulk. As a result, the DOEs and waveguides used in an EPE may be fabricated using lightweight polymers. Such polymeric components can support design goals for size, weight, and cost, and generally facilitate manufacturability, particularly in volume production settings. However, polymeric optical elements generally have lower optical resolution relative to heavier high quality glass. Such reduced optical resolution and the waveguide's configuration to be relatively thin for weight savings and packaging constraints within a device can result in optical interference that appears as a phenomenon referred to as "banding" in the display. The optical interference that results in banding arises from light propagating within the EPE that has several paths to the same location, in which the optical path lengths differ.

The banding is generally visible in the form of dark stripes which decrease optical uniformity of the display. Their location on the display may depend on small nanometer-scale variations in the optical elements including the DOEs in one or more of thickness, surface roughness, or grating geometry including grating line width, angle, fill factor, or the like. Such variation can be difficult to characterize and manage using tools that are generally available in manufacturing environments, and particularly for volume production. Conventional solutions to reduce banding include using thicker waveguides which can add weight and complicate package design for devices and systems. Other solutions use pupil expansion in the EPE in just one direction which can result in a narrow viewing angle and heightened sensitivity to natural eye variations among users.

The arrows in FIG. 5 show light propagating in DOE 2 when configured as a 1D grating that is periodic in one direction. As shown, light propagates from left to right in the waveguide and propagates downwards through refraction. As a result, light can loop around to any given point within DOE 2 over several paths in which the length of each path is essentially the same. However, since the differences in optical path lengths are smaller than the coherence length (i.e., a propagation distance over which the light may be considered coherent), even small differences in path length can result in strong interference in DOE 3 and reduce optical resolution, uniformity, and color balance in the optical display system. Use of a 1D grating for DOE 2 may also necessitate tight manufacturing tolerances to help reduce variability and achieve a target optical resolution. Maintaining tight manufacturing tolerances can be expensive and problematic, particularly for volume production of DOEs in the optical near-eye display systems. In some implementations, the out-coupling DOE 3 may be apodized with shallow gratings that are configured to be either straight or slanted.

Figure 6:
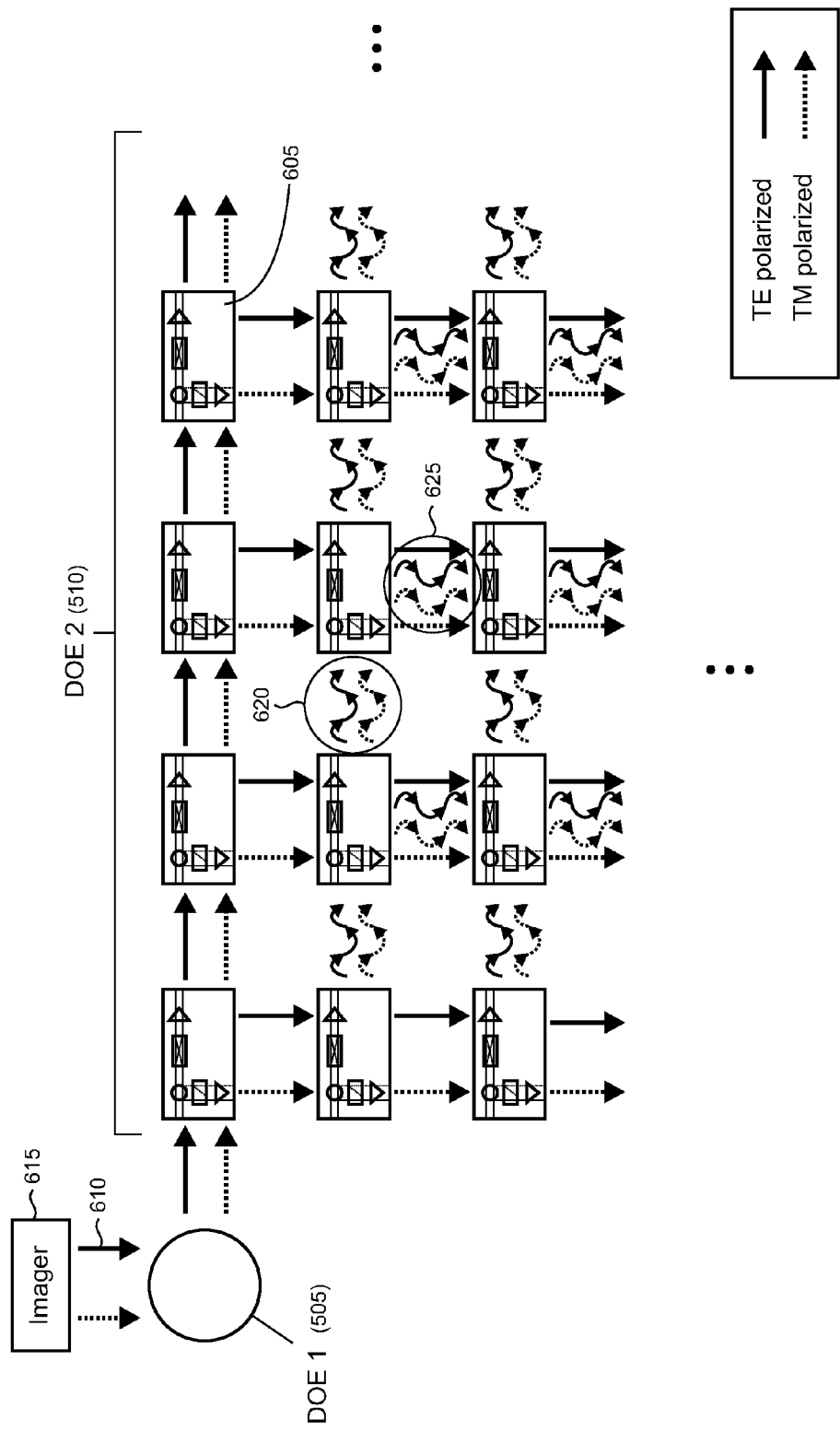
FIG. 6 illustratively depicts closed interfering loops between various arbitrary locations in a DOE.

FIG. 6 illustratively depicts closed loops (also known as Mach-Zehnder loops) formed by the multiple optical paths to various arbitrary locations in DOE 2 (representatively indicated by reference numeral 605). As shown, DOE 2 supports two polarization states including transverse electric (TE) polarization and transverse magnetic (TM) polarization. A main beam (representatively indicated by reference numeral 610) emanating from an imager 615 is in-coupled at DOE 1 and propagates to DOE 2. In this example, the main beam is a TM polarized beam, but the beam could alternatively be TE polarized, or be left- or right-hand circularly polarized. As light reaches each point in DOE 2, a portion is deflected downwards through diffraction towards DOE 3 (not shown) and a portion continues straight (i.e., towards the right in the drawing). In addition, energy transfer takes place between the two polarization states and the phase of the light changes.

Perturbations in light can be coupled between structures in adjacent locations in DOE 2 (as indicated by reference numerals 620 and 625 and using wavy lines) and result in closed-loop interference due to varying path lengths, as discussed above. The interference is typically manifested as banding in the downstream DOE 3. Conventional approaches to reducing the banding include global control over the phase of the light. While such approaches can provide some improvements, they generally make the optical system even more sensitive to manufacturing variations and/or necessitate complex nanometer-level grating microstructures to be utilized.

Figure 7:
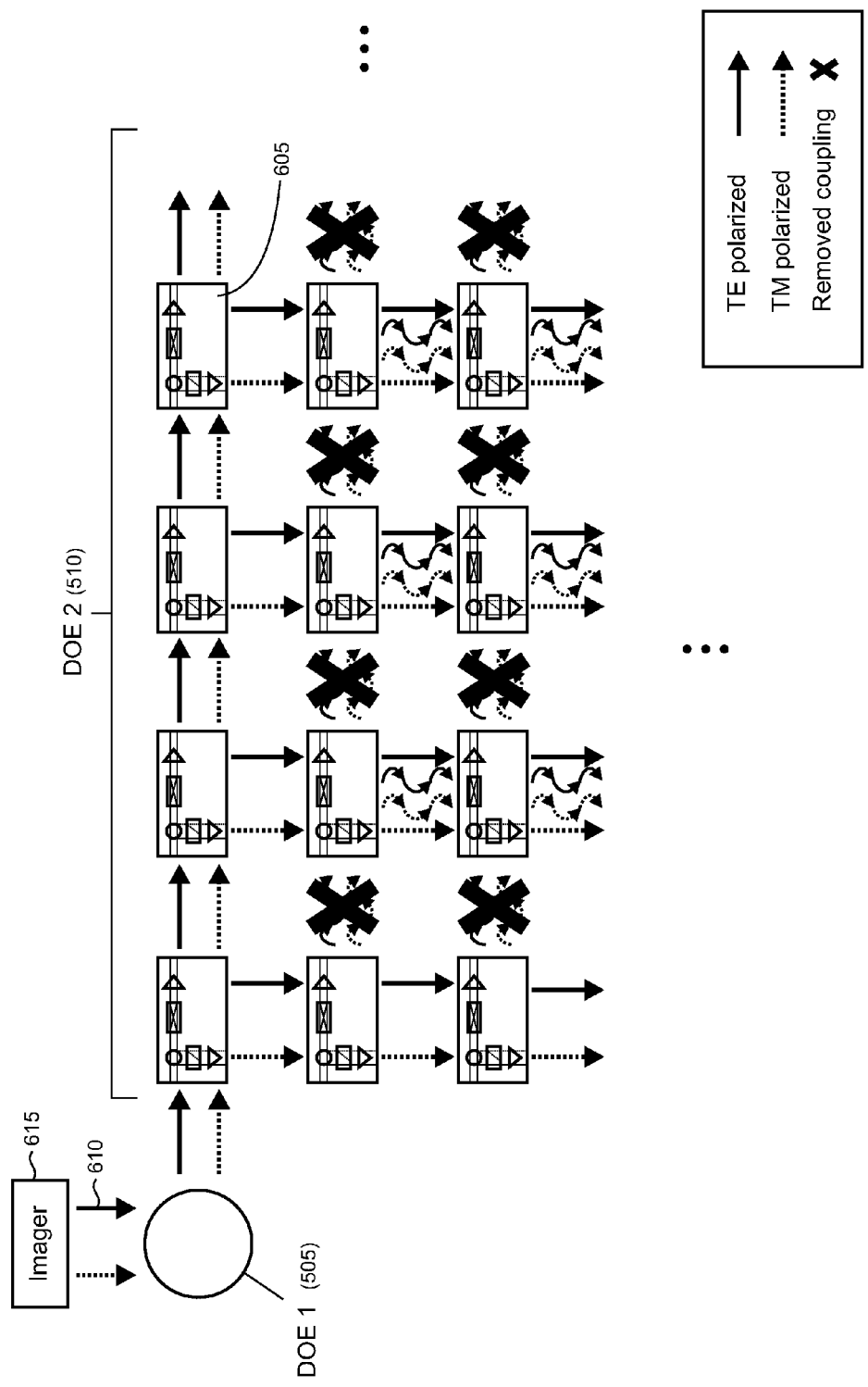
FIG. 7 shows an illustrative grating with uncoupled grating structures.
Figure 8:
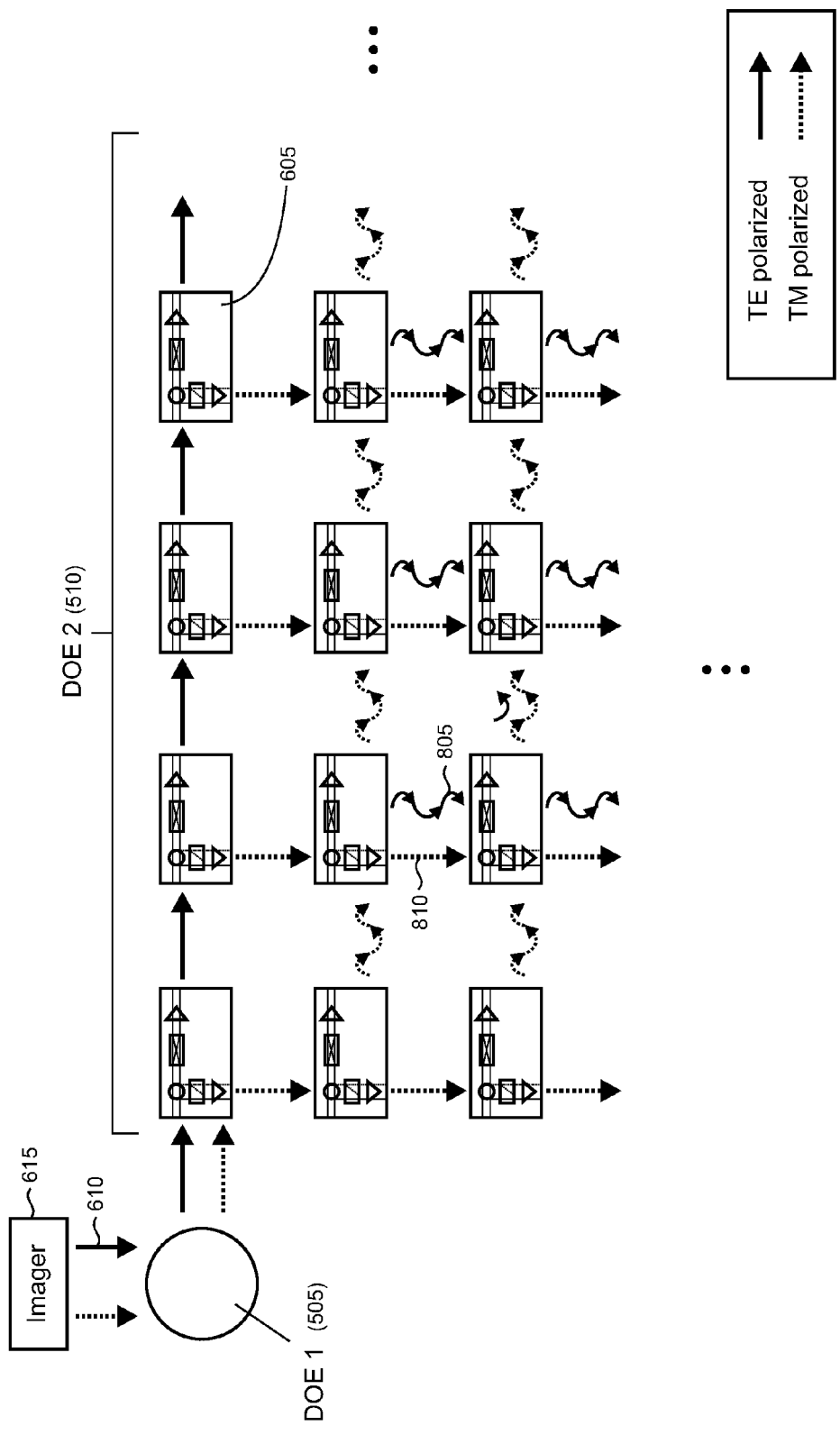
FIG. 8 shows how perturbed light is orthogonally rotated to have a different polarization state relative to a main beam.

By comparison, as shown in FIG. 7, the present uncoupled grating design provides a robust solution that removes or reduces the closed-loop coupling to enable manufacturing tolerances to be loosened in typical implementations without the use of additional structures. Here, DOE 2 is configured to rotate the polarization of the interfering beam orthogonally when it is deflected (i.e., downward propagating) so that its state of polarization changes from TM to TE polarization, as representatively indicated by reference numeral 805 in FIG. 8. As the perturbed light is now orthogonally polarized with respect to the main imaging beam (representatively indicated by reference numeral 810), it does not generate interference with the main imaging beam to thereby eliminate the closed-loop coupling in DOE 2. Without the closed-loop coupling, banding resulting from interference can be significantly reduced in the downstream DOE 3. Increased optical resolution, uniformity, and color fidelity may also be realized when the closed-loop coupling is removed by the present grating configuration.

The 3D microstructure forming DOE 2 can be configured to remove the closed-loop coupling discussed above by manipulating a combination of grating parameters that relate to grating line asymmetry and fill ratio. Grating depth is another exemplary parameter that can be manipulated in combination with grating line asymmetry and fill ratio in some cases. These parameters can be selected, adjusted, and/or tuned to implement polarization rotation in DOE 2 so that the perturbed beam has a different polarization state with respect to that of the main beam. In some implementations, the grating parameters can be iteratively manipulated in a given grating design until the closed-loop coupling is reduced so that the degree of banding observed in DOE 3 meets some predetermined criteria.

Figure 9:
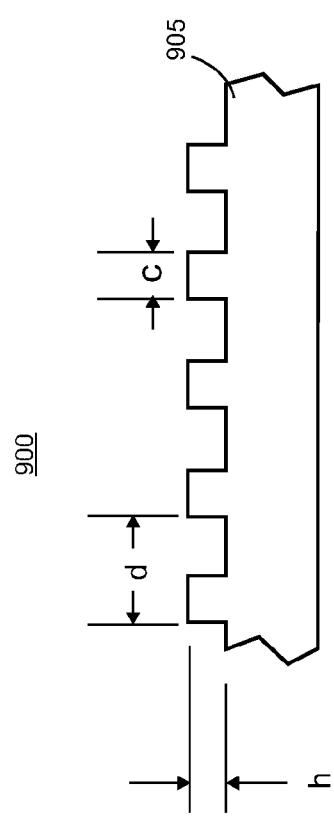
FIG. 9 shows a profile of a portion of an illustrative diffraction grating that has straight gratings.
Figure 10:
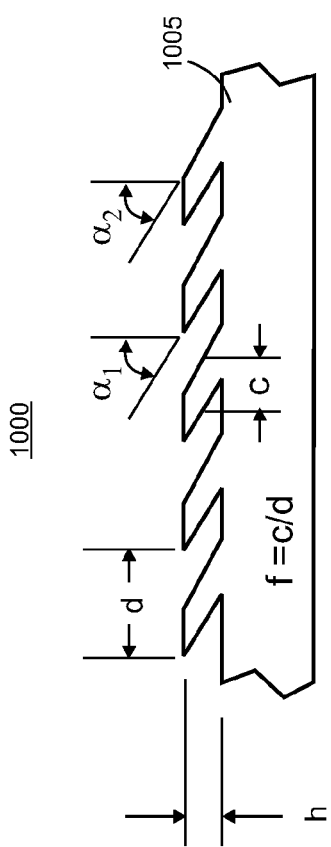
FIG. 10 shows an asymmetric profile of a portion of an illustrative diffraction grating that has asymmetric or slanted gratings.

Grating line asymmetry is described in more detail while making reference to FIGS. 9 and 10. FIG. 9 shows a profile of straight (i.e., non-slanted) grating features 900 (referred to as grating bars, grating lines, or simply "gratings"), that are formed in a substrate 905. By comparison, FIG. 10 shows grating features 1000 formed in a substrate 1005 that have an asymmetric profile. That is, the gratings may be slanted (i.e., non-orthogonal) relative to a plane of the waveguide. In implementations where the waveguide is non-planar, then the gratings may be slanted relative to a direction of light propagation in the waveguide. Asymmetric grating profiles can also be implemented using blazed gratings, or echelette gratings, in which grooves are formed to create grating features with asymmetric triangular or sawtooth profiles.

In FIGS. 9 and 10, the grating period is represented by d, the grating height by h (also referred to as grating "depth"), bar width c, and the fill factor by f, where f=c/d. The slanted gratings in FIG. 10 may be described by slant angles $\alpha_1$ and $\alpha_2$. In one exemplary embodiment, for a DOE, d=390 nm, c=d/2, h=300 nm, $\alpha_1=\alpha_2=45$ degrees, f=0.5, and the refractive index of the substrate material is approximately 1.71. In other implementations, ranges of suitable values may include d=250 nm-450 nm, h=200 nm-400 nm, f=0.3-0.0, and $\alpha_1$=30-50 degrees, with refractive indices of 1.7 to 1.9. In another exemplary embodiment, DOE 2 is configured with portions that have asymmetric profiles, while DOE 1 and DOE 3 are configured with conventional symmetric profiles using straight gratings.

Another illustrative grating parameter that may be manipulated in the optical display system relates to the direction of depth modulation in DOE 2. A given grating design may use a particular depth modulation direction, or a combination of different directions, in DOE 2 to control whether closed-loop interference is constructive or destructive. Depth modulation direction is discussed below with reference to FIGS. 11-16.

Figure 11:
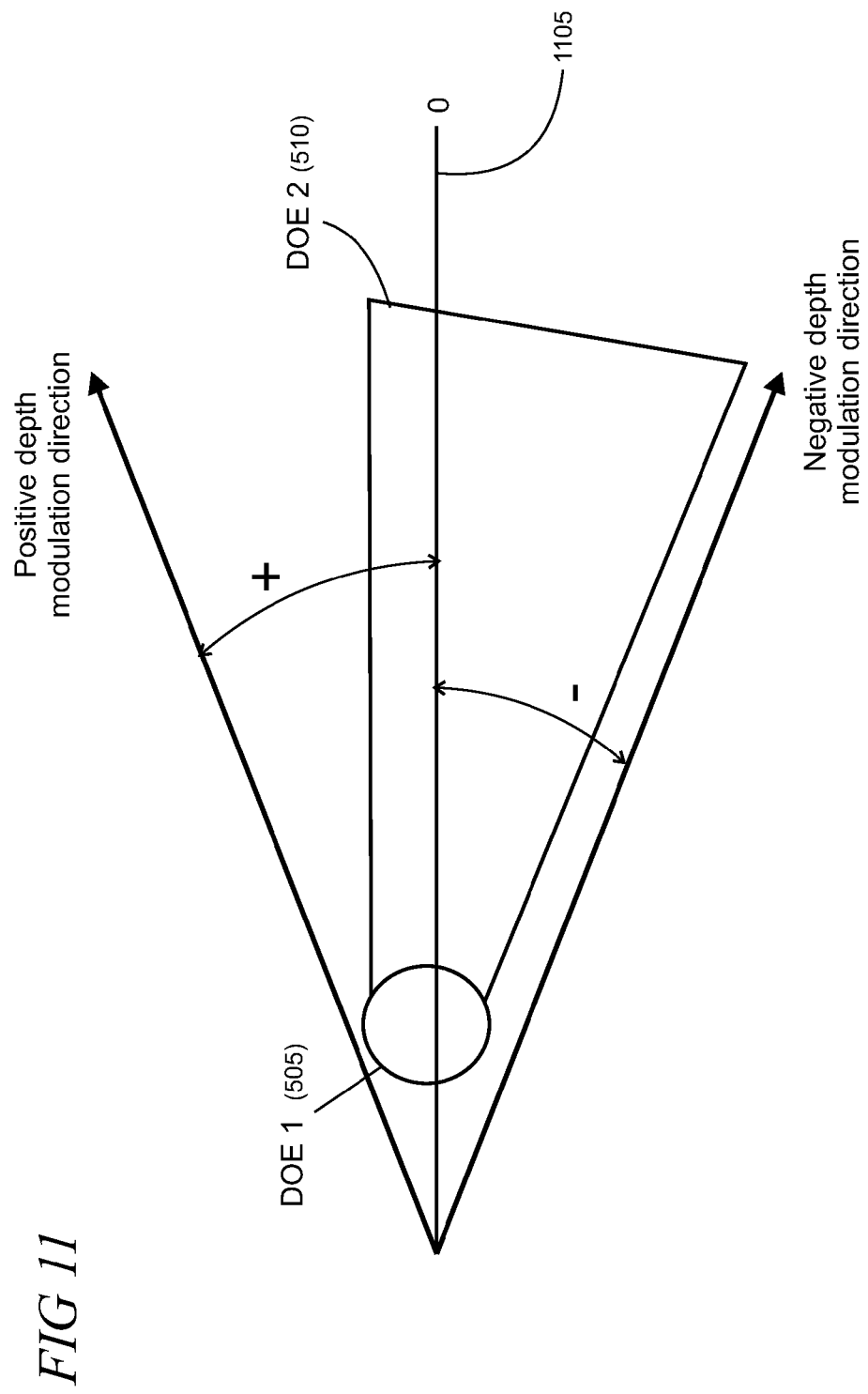
FIG. 11 shows sign notation that is applied to an illustrative DOE.

FIG. 11 shows positive and negative sign notation for depth modulation direction as illustratively applied to DOE 2. However, varying depth modulation direction can also be applied to various ones of the DOEs 1, 2, and 3, combinations of the DOEs, or all of the DOEs depending on the needs of a particular implementation. Depth modulation direction, as the term is used in this disclosure, is defined by a direction by which grating depth changes at the steepest rate. As shown, a zero axis 1105 runs parallel to a long edge of DOE 2. The depth modulation direction may be described by an angle within the plane of the waveguide with respect to the zero axis. Thus, as shown, a positive direction for depth modulation has a counterclockwise rotation with respect to the zero axis, while a negative direction for depth modulation has a clockwise rotation with respect to the zero axis.

FIGS. 12-15 show various examples of DOE 2 (element 510 in FIG. 5) with different illustrative depth modulation directions. A gradient depicted in the figures indicates grating depth, with lighter portions of the gradient representing shallower grooves and the darker portions representing deeper grooves. The grating heights are depicted in the enlarged sectional views in order to illustrate the present principles and are not drawn to scale.

Figure 12:
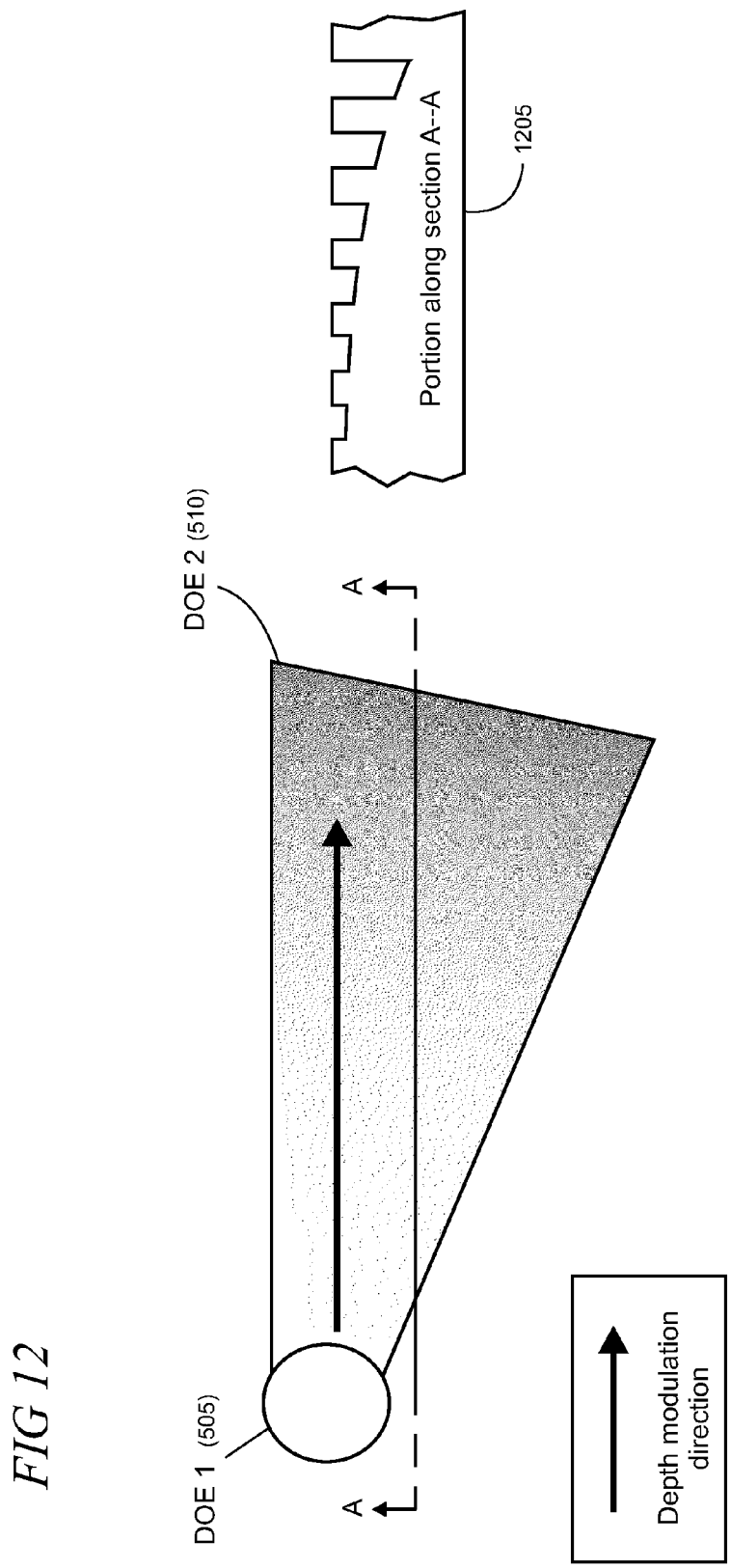
FIGS. 12-15 show various examples of a DOE with different illustrative depth modulation directions.

In FIG. 12, the depth modulation direction is zero degrees as it is parallel to the zero axis and the direction of the steepest change in grating depth is parallel to a long edge of DOE 2. The enlarged sectional view 1205 of a representative portion of the gratings taken along section A-A shows grating depth increasing from left to right. Section 1205 may therefore be viewed as having a grating depth with a positive slope (i.e., grating depth increases along the direction of depth modulation in DOE 2 in this particular illustrative example).

Figure 13:
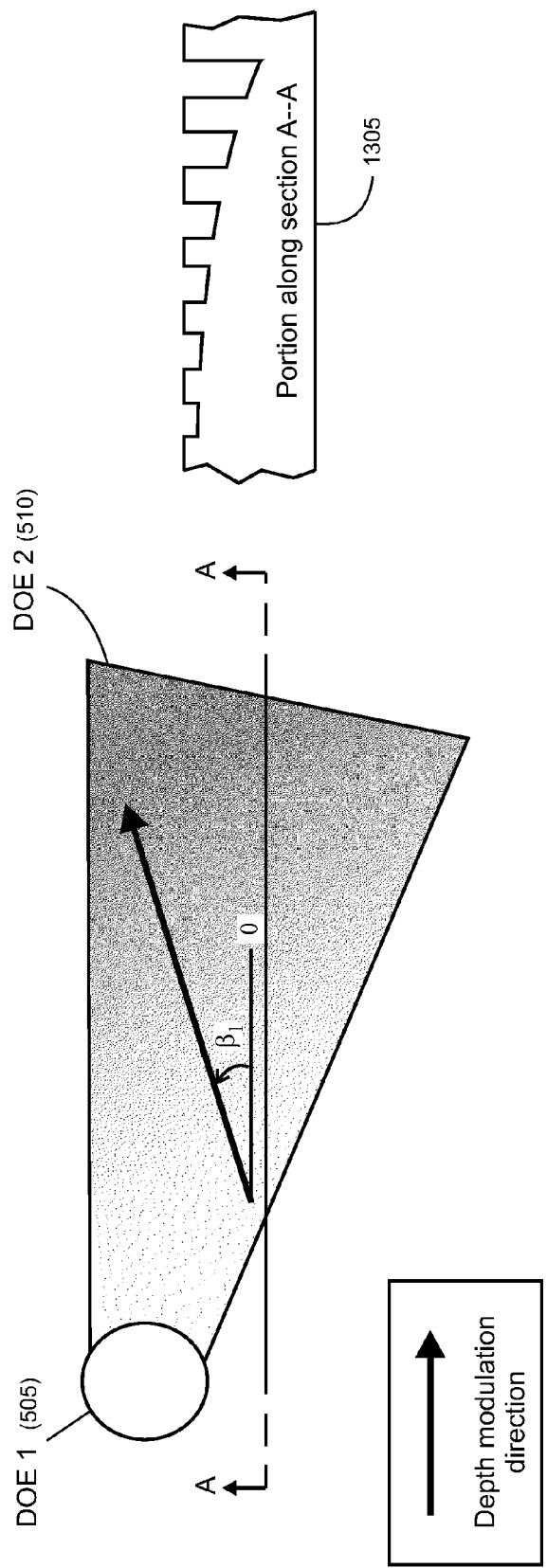

FIG. 13 shows an illustrative example in which the steepest slope for the grating depth is at an angle $\beta_1$ with respect to the zero axis. According to the coordinate system shown in FIG. 11, the depth modulation direction is positive. The enlarged sectional view 1305 shows a representative portion of the gratings taken along section A-A. The grating depth slope is positive.

Figure 14:
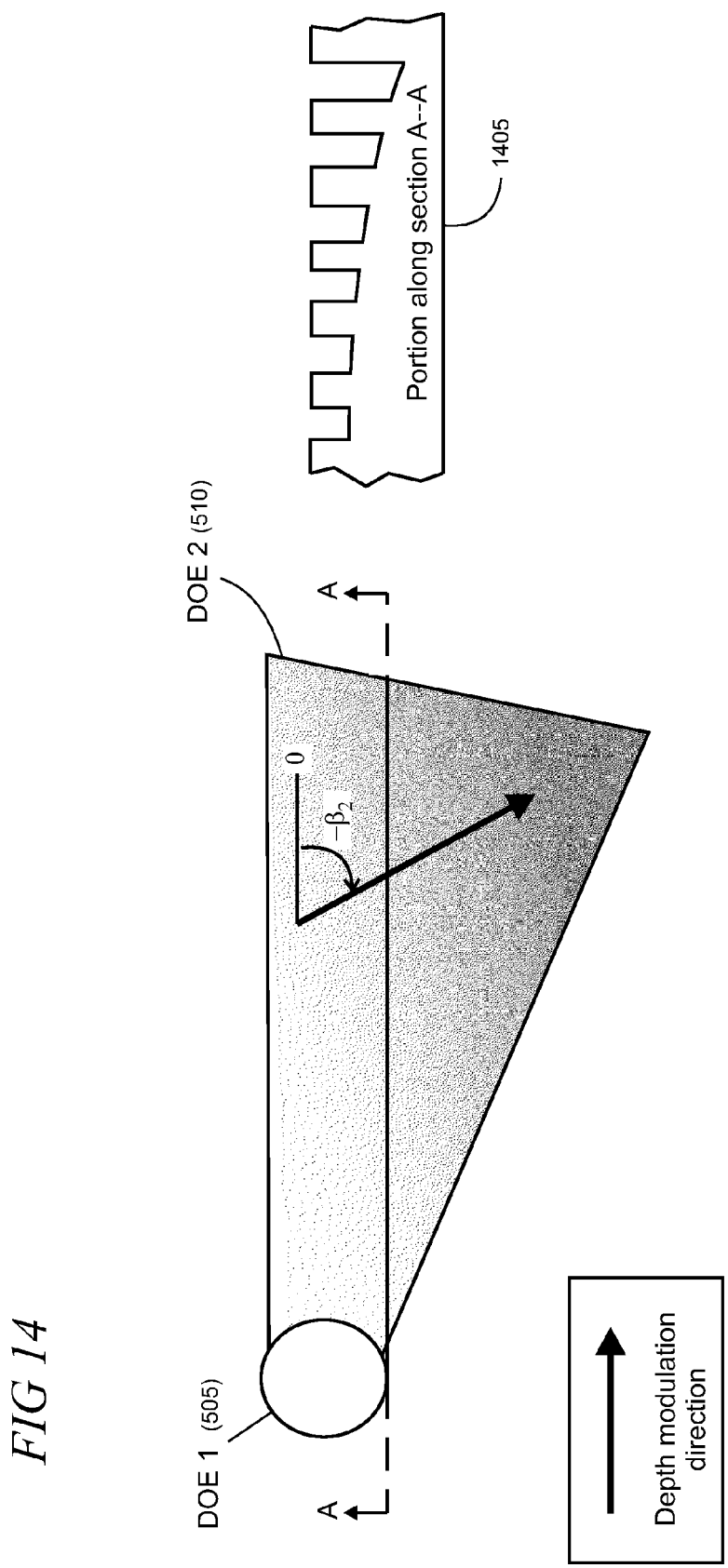

FIG. 14 shows an illustrative example in which the steepest slope for the grating depth is at an angle $-\beta_2$ with respect to the zero axis. The negative sign indicates a clockwise rotation angle, as discussed above, and the depth modulation direction is negative. The enlarged sectional view 1405 shows a representative portion of the gratings taken along section A-A. The grating depth slope is also positive in this illustrative example.

Figure 15:
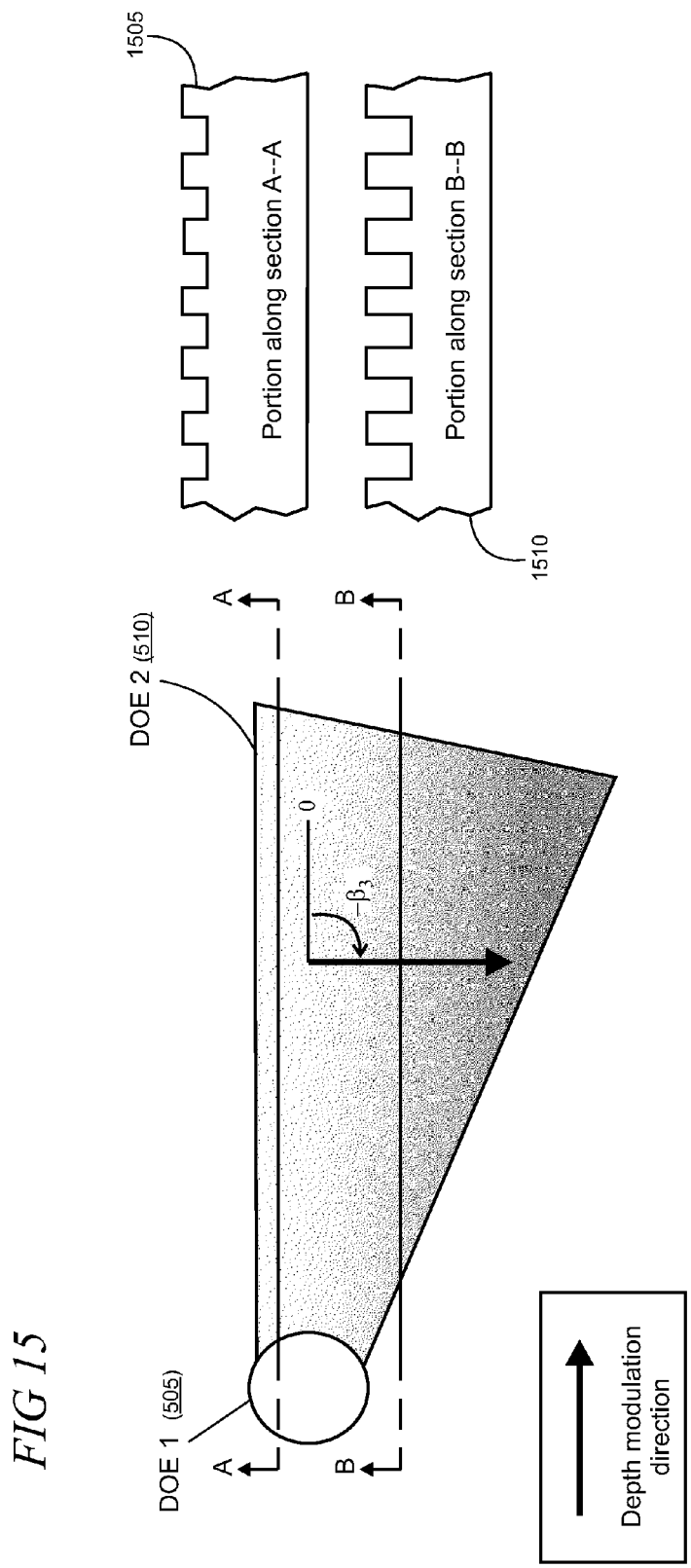

FIG. 15 shows an illustrative example in which the steepest slope for the grating depth is at an angle $-\beta_3$ with respect to the zero axis and the depth modulation direction is negative. The enlarged sectional view 1505 of a representative portion of the gratings taken along section A-A shows that the grating depth does not increase from left to right. Rather, the groove depth increases in the depth modulation direction as shown in the sectional view 1510 which depicts a representative portion of the gratings taken along section B-B.

Figure 16:
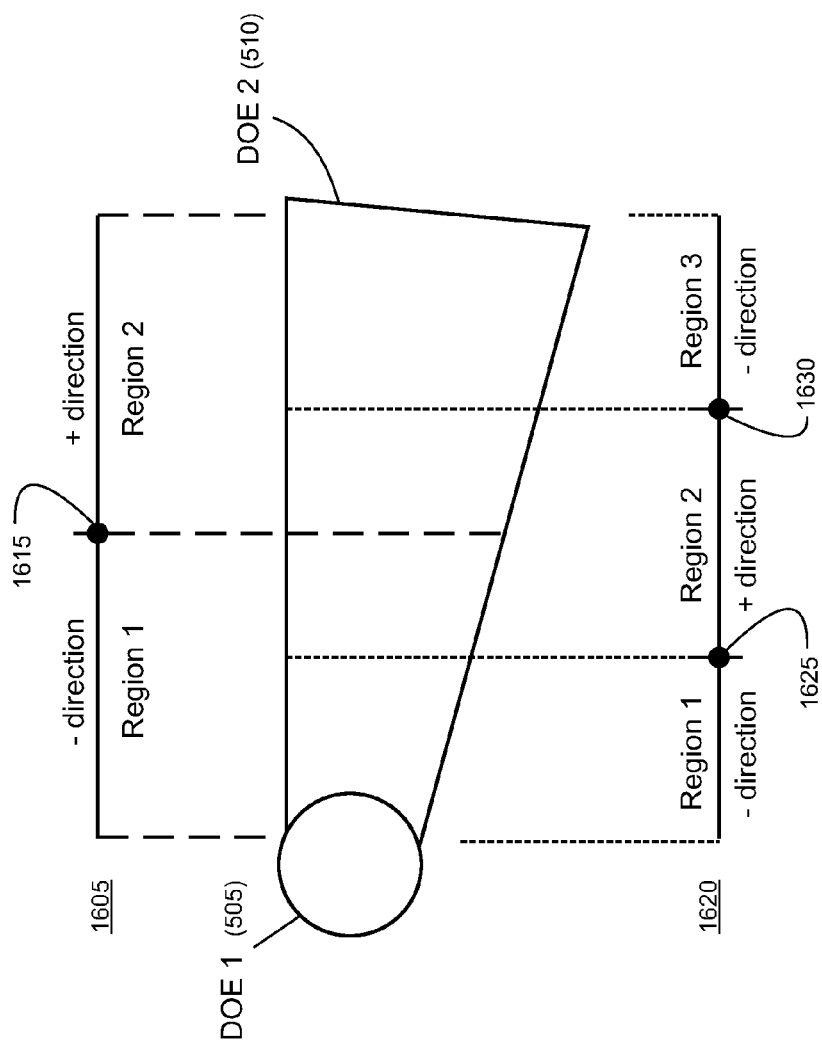
FIG. 16 shows an illustrative DOE that is configured with regions that have different depth modulation directions.

FIG. 16 shows illustrative examples in which DOE 2 (510) is configured with multiple regions. In a first illustrative example, as indicated by reference numeral 1605, DOE 2 is configured with two regions, Region 1 and Region 2, in which the depth modulation direction is negative in Region 1 and the depth modulation direction is positive in Region 2. At a transition point 1615 between Region 1 and Region 2, the depth modulation changes direction. The location of the transition point can vary, and in this particular example the transition point is located approximately halfway along DOE 2. In some cases, the depth modulation direction may be changed at the transition point as a step function with no intermediate directions between negative and positive directions. In other cases, the depth modulation direction may be more smoothly varied over a distance on DOE 2 between negative and positive directions.

In a second illustrative example, as indicated by reference numeral 1620, DOE 2 is configured with three regions: Region 1, Region 2, and Region 3. The depth modulation direction is negative in Region 1, positive in Region 2, and negative in Region 3. As with the first illustrative example, the change of direction may be implemented at each of the transition points 1625 and 1630 either as a step function or using a smooth variation over some distance of DOE 2. The number of regions utilized for a given implementation can vary according to design targets, DOE size, and manufacturing capabilities, among other factors.

Figure 17:
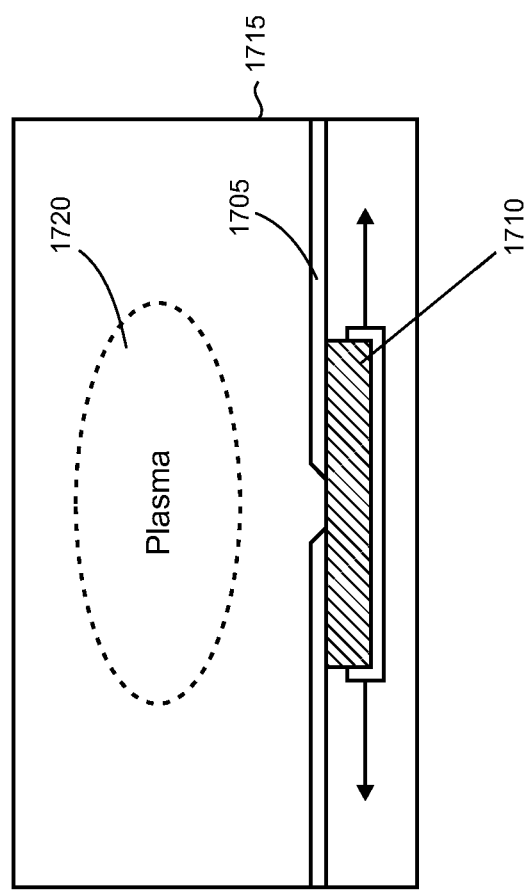
FIG. 17 shows an illustrative arrangement for DOE fabrication using a mask that moves relative to a substrate.

FIG. 17 shows an illustrative arrangement for DOE fabrication using a mask 1705 that moves relative to a photo-sensitive grating substrate 1710 within an enclosure 1715. A reactive ion etching plasma 1720 is used to adjust the thickness of the etching on the grating substrate at various positions by moving the substrate relative to the mask using, for example, a computer-controller stepper functionality or other suitable control system. In an illustrative example, the etching may be performed using a reactive ion beam etching (RIBE). However, other variations of ion beam etching may be utilized in various implementations including, for example, magnetron reactive ion etching (MRIE), high density plasma etching (HDP), transformer coupled plasma etching (TCP), inductively coupled plasma etching (ICP), and electron cyclotron resonance plasma etching (ECR).

By controlling the exposure of the substrate to the plasma through the mask aperture, grating depth can be varied as a function of position over the extent of the substrate. The resulting microstructure on the substrate may be replicated for mass production in a lightweight polymer material using one of cast-and-cure, embossing, compression molding, or compression injection molding, for example.

Figure 18:
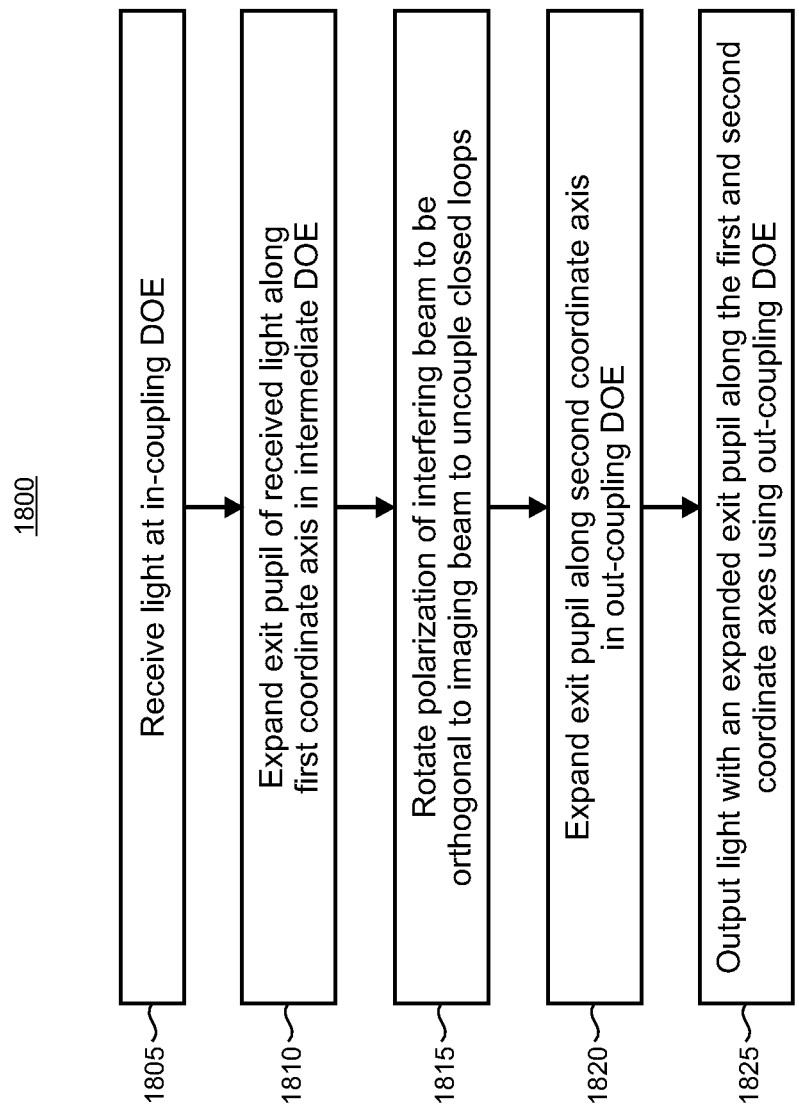
FIG. 18 shows an illustrative method.

FIG. 18 is a flowchart of an illustrative method 1800. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1805, light is received at an in-coupling DOE. The in-coupling grating is disposed in an EPE and interfaces with the downstream intermediate DOE that is disposed in the EPE. In step 1810, the exit pupil of the received light is expanded along a first coordinate axis in the intermediate DOE. In step 1815, the intermediate DOE performs polarization rotation of perturbed light, as it is diffracted in the direction of DOE 3 (i.e., downward), which is potentially interfering with in-coupled light that is used for the imaging beam. The rotation to an orthogonal polarization state makes the perturbed beam non-interfering with the imaging beam to thereby uncouple the closed loops between grating structures at adjacent locations within the intermediate DOE. The intermediate DOE may also be configured with at least two regions in which depth modulation direction is changed at each of the transitions between regions. The gratings can be straight or slanted in the intermediate DOE and grating symmetry, fill ratio, depth, and/or depth modulation depth may be iteratively selected in a given grating design in order to empirically determine a combination of grating parameters that produce a degree of uncoupling and increase in display uniformity that meet the design objectives.

In step 1820, the exit pupil is expanded in an out-coupling DOE which outputs light with an expanded exit pupil relative to the received light at the in-coupling DOE along the first and second coordinate axes in step 1825. The intermediate DOE is configured to the interface with a downstream out-coupling DOE. In some implementations, the out-coupling DOE may be apodized with shallow gratings that are configured to be either straight or slanted.

A DOE with uncoupled grating structures may be incorporated into a display system that is utilized in a virtual or mixed reality display device. Such device may take any suitable form, including but not limited to near-eye devices such as an HMD device. A see-through display may be used in some implementations while an opaque (i.e., non-see-through) display using a camera-based pass-through or outward facing sensor, for example, may be used in other implementations.

Figure 19:
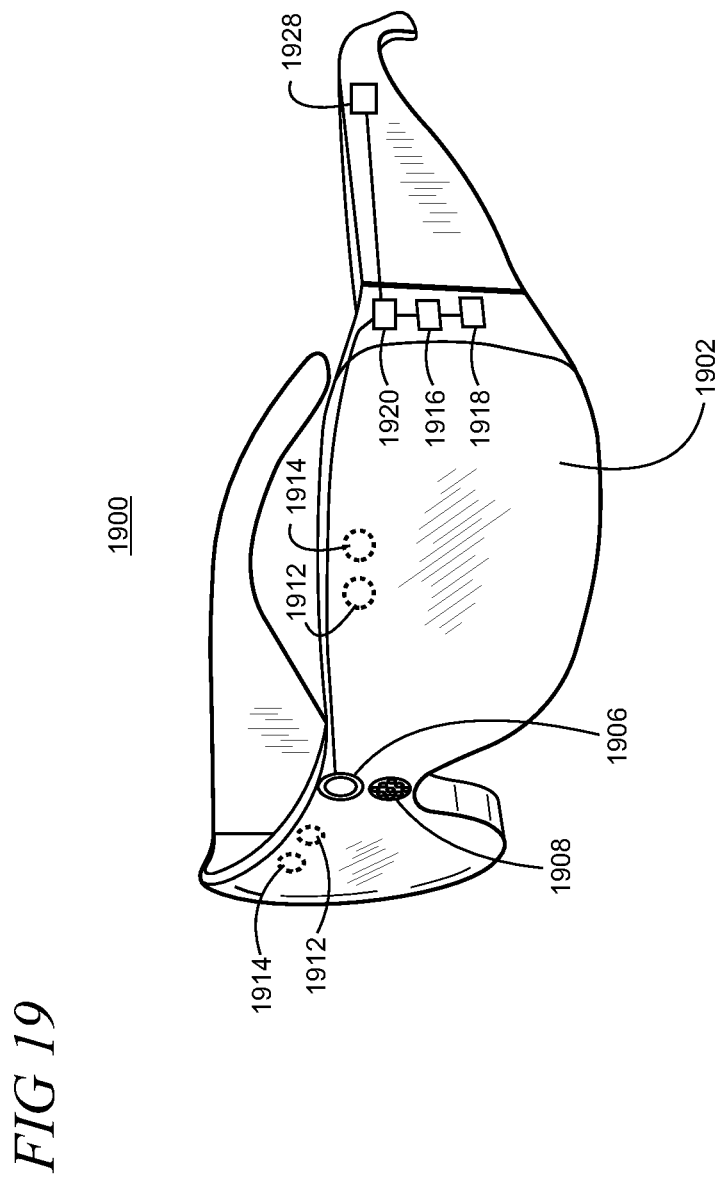
FIG. 19 is a pictorial view of an illustrative example of a virtual reality or mixed reality head mounted display (HMD) device.
Figure 20:
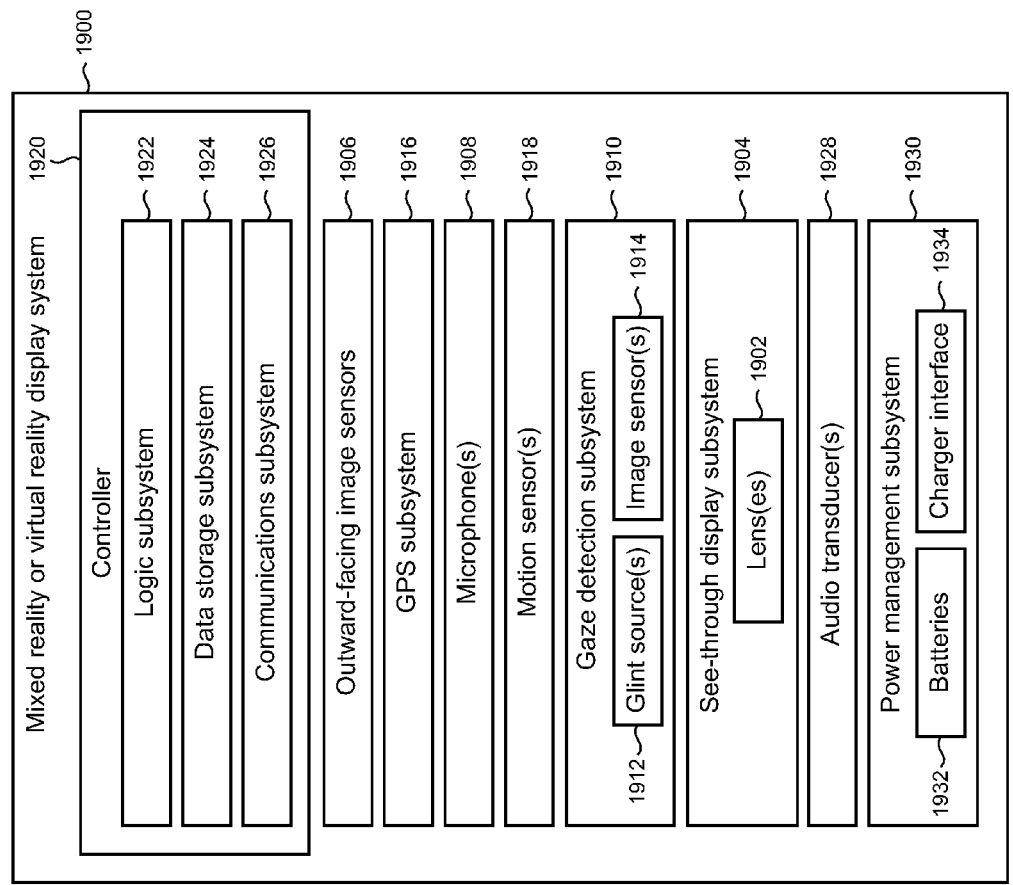
FIG. 20 shows a block diagram of an illustrative example of a virtual reality or mixed reality HMD device.

FIG. 19 shows one particular illustrative example of a see-through, mixed reality or virtual reality display system 1900, and FIG. 20 shows a functional block diagram of the system 1900. Display system 1900 comprises one or more lenses 1902 that form a part of a see-through display subsystem 1904, such that images may be displayed using lenses 1902 (e.g. using projection onto lenses 1902, one or more waveguide systems incorporated into the lenses 1902, and/or in any other suitable manner). Display system 1900 further comprises one or more outward-facing image sensors 1906 configured to acquire images of a background scene and/or physical environment being viewed by a user, and may include one or more microphones 1908 configured to detect sounds, such as voice commands from a user. Outward-facing image sensors 1906 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The display system 1900 may further include a gaze detection subsystem 1910 configured for detecting a direction of gaze of each eye of a user or a direction or location of focus, as described above. Gaze detection subsystem 1910 may be configured to determine gaze directions of each of a user's eyes in any suitable manner. For example, in the illustrative example shown, a gaze detection subsystem 1910 includes one or more glint sources 1912, such as infrared light sources, that are configured to cause a glint of light to reflect from each eyeball of a user, and one or more image sensors 1914, such as inward-facing sensors, that are configured to capture an image of each eyeball of the user. Changes in the glints from the user's eyeballs and/or a location of a user's pupil, as determined from image data gathered using the image sensor(s) 1914, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1910 may have any suitable number and arrangement of light sources and image sensors. In some implementations, the gaze detection subsystem 1910 may be omitted.

The display system 1900 may also include additional sensors. For example, display system 1900 may comprise a global positioning system (GPS) subsystem 1916 to allow a location of the display system 1900 to be determined This may help to identify real world objects, such as buildings, etc. that may be located in the user's adjoining physical environment.

The display system 1900 may further include one or more motion sensors 1918 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 1906. The use of motion data may allow changes in gaze location to be tracked even if image data from outward-facing image sensor(s) 1906 cannot be resolved.

In addition, motion sensors 1918, as well as microphone(s) 1908 and gaze detection subsystem 1910, also may be employed as user input devices, such that a user may interact with the display system 1900 via gestures of the eye, neck and/or head, as well as via verbal commands in some cases. It may be understood that sensors illustrated in FIGS. 19 and 20 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1900 can further include a controller 1920 having a logic subsystem 1922 and a data storage subsystem 1924 in communication with the sensors, gaze detection subsystem 1910, display subsystem 1904, and/or other components through a communications subsystem 1926. The communications subsystem 1926 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1924 may include instructions stored thereon that are executable by logic subsystem 1922, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1900 is configured with one or more audio transducers 1928 (e.g., speakers, earphones, etc.) so that audio can be utilized as part of a mixed reality or virtual reality experience. A power management subsystem 1930 may include one or more batteries 1932 and/or protection circuit modules (PCMs) and an associated charger interface 1934 and/or remote power interface for supplying power to components in the display system 1900.

It may be appreciated that the display system 1900 is described for the purpose of example, and thus is not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 21:
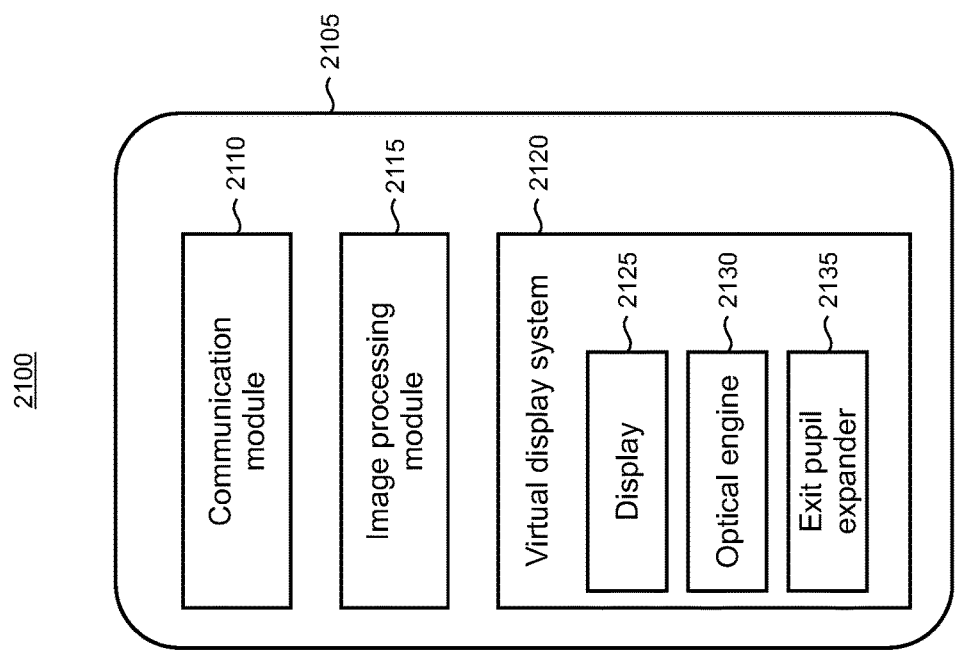
FIG. 21 shows a block diagram of an illustrative electronic device that incorporates an exit pupil expander.

As shown in FIG. 21, an EPE incorporating a DOE with uncoupled grating structures can be used in a mobile or portable electronic device 2100, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 2100 includes a housing 2105 to house a communication module 2110 for receiving and transmitting information from and to an external device, or a remote system or service (not shown).

The portable device 2100 may also include an image processing module 2115 for handling the received and transmitted information, and a virtual display system 2120 to support viewing of images. The virtual display system 2120 can include a micro-display or an imager 2125 and an optical engine 2130. The image processing module 2115 may be operatively connected to the optical engine 2130 to provide image data, such as video data, to the imager 2125 to display an image thereon. An EPE 2135 using a DOE with uncoupled grating structures can be optically linked to an optical engine 2130.

An EPE using a DOE with uncoupled grating structures may also be utilized in non-portable devices, such as gaming devices, multimedia consoles, personal computers, vending machines, smart appliances, Internet-connected devices, and home appliances, such as an oven, microwave oven and other appliances, and other non-portable devices.

Various exemplary embodiments of the present diffractive optical element with uncoupled grating structures are now presented by way of illustration and not as an exhaustive list of all embodiments. An example includes an optical system, comprising: a substrate of optical material; a first diffractive optical element (DOE) disposed on the substrate, the first DOE having an input surface and configured as an in-coupling grating to receive one or more optical beams as an input; and a second DOE disposed on the substrate and configured for pupil expansion of the one or more optical beams along a first direction, wherein at least a portion of the second DOE includes grating features configured to rotate a state of polarization of light perturbations to be orthogonal relative to a polarization of the input optical beams to reduce coupling between closed loops in the second DOE arising from multiple optical paths to a given location in the second DOE in which path length differences are smaller than a coherence length.

In another example, the configured grating features include at least one of grating asymmetry, grating depth, or grating fill factor. In another example, the grating asymmetry is implemented using one of slanted gratings or blazed gratings. In another example, the optical system further includes a third DOE disposed on the substrate, the third DOE having an output surface and configured for pupil expansion of the one or more optical beams along a second direction, and further configured as an out-coupling grating to couple, as an output from the output surface, one or more optical beams with expanded pupil relative to the input. In another example, differences among optical path lengths in the second DOE exceed a coherence length so as to improve display uniformity in the third DOE.

A further examples includes an electronic device, comprising: a data processing unit; an optical engine operatively connected to the data processing unit for receiving image data from the data processing unit; an imager operatively connected to the optical engine to form images based on the image data and to generate one or more input optical beams incorporating the images; and an exit pupil expander, responsive to the one or more input optical beams, comprising a structure on which multiple diffractive optical elements (DOEs) are disposed, in which the exit pupil expander is configured to provide one or more output optical beams, using one or more of the DOEs, as a near-eye virtual display with an expanded exit pupil, and wherein at least one of the DOEs has a portion configured with uncoupled grating structures in which a polarization state of optical perturbations is rotated to be non-interfering with the input optical beams.

In another example, the portion of the DOE supports multiple optical paths to a given point within the portion of the DOE wherein differences in the multiple optical path lengths exceed a coherence length of an input optical beam. In another example, the exit pupil expander provides pupil expansion in two directions. In another example, the imager includes one of light emitting diode, liquid crystal on silicon device, organic light emitting diode array, or micro-electro mechanical system device. In another example, the imager comprises a micro-display operating in one of transmission, reflection, or emission. In another example, the electronic device is implemented in a head mounted display device or portable electronic device. In another example, each of the one or more input optical beams is produced by a corresponding one or more sources. In another example, the structure is curved or partially spherical. In another example, two or more of the DOEs are non-co-planar.

A further examples includes a method, comprising: receiving light at an in-coupling diffractive optical element (DOE) disposed in an exit pupil expander; expanding an exit pupil of the received light along a first coordinate axis in an intermediate DOE disposed in the exit pupil expander; expanding the exit pupil along a second coordinate axis in an out-coupling DOE disposed in the exit pupil expander; and outputting light as an imaging beam with an expanded exit pupil relative to the received light at the in-coupling DOE along the first and second coordinate axes using the out-coupling DOE, in which the intermediate DOE includes grating features configured to change a polarization state of an interfering optical beam to be orthogonal to a polarization state of the imaging beam.

In another example, parameters describing the grating features are selected in an iterative process to reduce closed-loop coupling of the intermediate DOE by observing a level of banding in the EPE. In another example, the in-coupling DOE, the intermediate DOE, or the out-coupling DOE is formed with a polymer that is molded from a substrate that is etched using ion beam etching in which the substrate is moveable relative to an ion beam source. In another example, the method further includes implementing varying depth modulation direction in the intermediate DOE to control whether the interfering optical beam causes constructive or destructive interference. In another example, the method is performed in a near-eye display system. In another example, the output light provides a virtual display to a user of the near-eye display system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. An optical system, comprising:
   a substrate of optical material;
   a first diffractive optical element (DOE) disposed on the substrate, the first DOE having an input surface and configured as an in-coupling grating to receive one or more optical beams as an input; and
   a second DOE disposed on the substrate and configured for pupil expansion of the one or more optical beams along a first direction,
      wherein at least a portion of the second DOE comprises grating features configured to rotate a state of polarization of light perturbations to be orthogonal relative to a polarization of the input optical beams to reduce coupling between closed loops in the second DOE arising from multiple optical paths to a given location in the second DOE in which path length differences are smaller than a coherence length.

2. The optical system of claim 1, in which the configured grating features comprise at least one of grating asymmetry, grating depth, or grating fill factor.

3. The optical system of claim 2, in which the grating asymmetry is implemented using one of slanted gratings or blazed gratings.

4. The optical system of claim 1, further including a third DOE disposed on the substrate, the third DOE having an output surface and configured for pupil expansion of the one or more optical beams along a second direction, and further configured as an out-coupling grating to couple, as an output from the output surface, one or more optical beams with expanded pupil relative to the input.

5. The optical system of claim 4, in which differences among optical path lengths in the second DOE exceed a coherence length so as to improve display uniformity in the third DOE.

6. An electronic device, comprising:
a data processing unit;
an optical engine operatively connected to the data processing unit for receiving image data from the data processing unit;
an imager operatively connected to the optical engine to form images based on the image data and to generate one or more input optical beams incorporating the images; and
an exit pupil expander, responsive to the one or more input optical beams, comprising a structure on which multiple diffractive optical elements (DOEs) are disposed,
in which the exit pupil expander is configured to provide one or more output optical beams, using one or more of the DOEs, as a near-eye virtual display with an expanded exit pupil, and
wherein at least one of the DOEs has a portion configured with uncoupled grating structures in which a polarization state of optical perturbations is rotated to be non-interfering with the input optical beams.

7. The electronic device of claim 6, in which the portion of the DOE supports multiple optical paths to a given point within the portion of the DOE wherein differences in the multiple optical path lengths exceed a coherence length of an input optical beam.

8. The electronic device of claim 6, in which the exit pupil expander provides pupil expansion in two directions.

9. The electronic device of claim 6, in which the imager includes one of light emitting diode, liquid crystal on silicon device, organic light emitting diode array, or micro-electro mechanical system device.

10. The electronic device of claim 6, in which the imager comprises a micro-display operating in one of transmission, reflection, or emission.

11. The electronic device of claim 6, as implemented in a head mounted display device or portable electronic device.

12. The electronic device of claim 6, in which each of the one or more input optical beams is produced by a corresponding one or more sources.

13. The electronic device of claim 6, in which the structure is curved or partially spherical.

14. The electronic device of claim 6, in which two or more of the DOEs are non-co-planar.

15. A method, comprising:
receiving light at an in-coupling diffractive optical element (DOE) disposed in an exit pupil expander;
expanding an exit pupil of the received light along a first coordinate axis in an intermediate DOE disposed in the exit pupil expander;
expanding the exit pupil along a second coordinate axis in an out-coupling DOE disposed in the exit pupil expander; and
outputting light as an imaging beam with an expanded exit pupil relative to the received light at the in-coupling DOE along the first and second coordinate axes using the out-coupling DOE,
in which the intermediate DOE includes grating features configured to change a polarization state of an interfering optical beam to be orthogonal to a polarization state of the imaging beam.

16. The method of claim 15, in which parameters describing the grating features are selected in an iterative process to reduce closed-loop coupling in the intermediate DOE by observing a level of banding in the exit pupil expander.

17. The method of claim 15, in which the in-coupling DOE, the intermediate DOE, or the out-coupling DOE is formed with a polymer that is molded from a substrate that is etched using ion beam etching in which the substrate is moveable relative to an ion beam source.

18. The method of claim 15, further including implementing varying depth modulation direction in the intermediate DOE to control whether the interfering optical beam causes constructive or destructive interference.

19. The method of claim 15, as performed in a near-eye display system.

20. The method of claim 19, in which the output light provides a virtual display to a user of the near-eye display system.

* * * * *